(12) United States Patent
Smaragdis et al.

(10) Patent No.: US 8,055,662 B2
(45) Date of Patent: Nov. 8, 2011

(54) METHOD AND SYSTEM FOR MATCHING AUDIO RECORDING

(75) Inventors: Paris Smaragdis, Brookline, MA (US); Madhusudana Shashanka, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1107 days.

(21) Appl. No.: 11/845,151

(22) Filed: Aug. 27, 2007

(65) Prior Publication Data
US 2009/0062942 A1    Mar. 5, 2009

(51) Int. Cl.
*G06F 17/00* (2006.01)
(52) U.S. Cl. .................. 707/748; 707/766; 707/780
(58) Field of Classification Search .................. 707/748
See application file for complete search history.

(56) References Cited

U.S. PATENT DOCUMENTS

| | | | |
|---|---|---|---|
| 7,772,478 B2* | 8/2010 | Whitman et al. | 84/609 |
| 7,783,930 B2* | 8/2010 | Gilge | 714/43 |
| 2006/0222318 A1* | 10/2006 | Momosaki et al. | 386/46 |
| 2009/0113305 A1* | 4/2009 | Graif et al. | 715/727 |

* cited by examiner

*Primary Examiner* — Don Wong
*Assistant Examiner* — Binh V Ho
(74) *Attorney, Agent, or Firm* — Dirk Brinkman; Gene Vinokur

(57) ABSTRACT

Our invention describes a method and a system for matching securely an unknown audio recording with known audio recordings. A plurality of known audio recordings, each known audio recording associated with an index to information uniquely identifying the known audio recording is stored on a server. An unknown audio recording cross-correlated securely with each of the plurality of known audio recordings to determine a best matching known audio recording, in which the unknown audio recording and the plurality of known audio recordings are encrypted with a public key. A best matching known audio recording is determined securely according to the cross-correlation. Next, the index of the best matching known audio recording is determined securely. Finally, the information associated with the index of the best matching known audio recording is provided securely to a user of the unknown recording.

11 Claims, 1 Drawing Sheet

METHOD AND SYSTEM FOR MATCHING AUDIO RECORDING

FIELD OF THE INVENTION

The invention relates generally to matching audio recording, and more particularly to matching music while preserving privacy.

BACKGROUND OF THE INVENTION

Consumers are increasingly turning to the Internet to obtain audio content, such as music. Instead of buying music on CDs or tapes from stores, consumers download music from on-line music vendors. The music is often stored in digital form in a database of a server connected to the network. This enables users of client playback devices, such iPods to "download" copies of the music. It is desired to obtain information identifying audio content in such a way that privacy of the consumer and music vendor is preserved.

SUMMARY OF THE INVENTION

The embodiments of the invention provide a method and system for matching audio recording using privacy-preserving transactions. In particular, the invention match a piece of music stored in a client device to a database of music stored in a server. The method uses secure multiparty computation.

DETAILED DESCRIPTION OF THE PREFERRED EMBODIMENT

Figure 1:
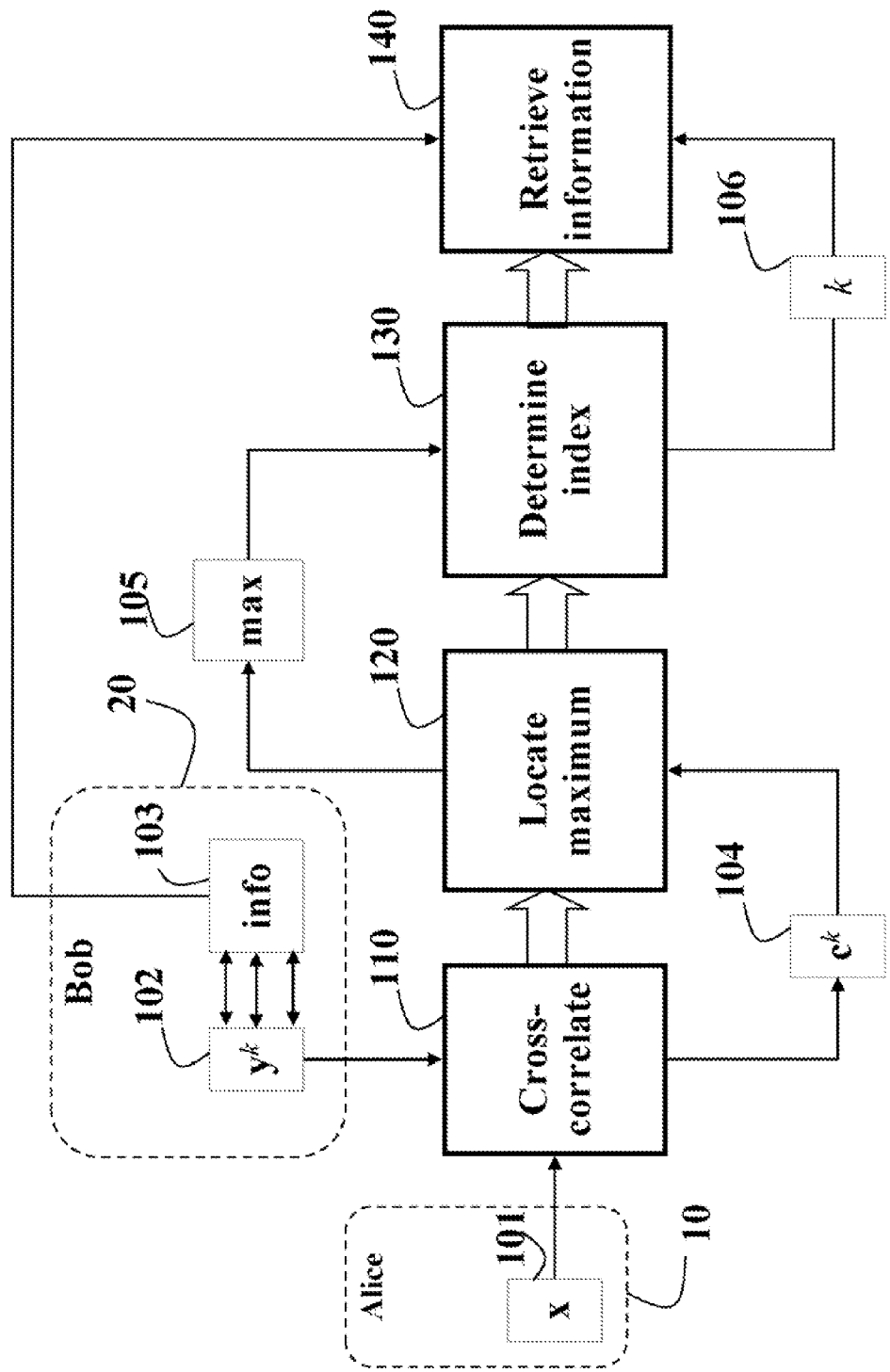
FIG. 1 is a flow diagram of a method and system for matching audio recordings according to an embodiment of the invention.

FIG. 1 shows a method and system for matching an audio recording according to an embodiment of our invention. A user (Alice) has a client device 10 that stores an unknown audio recording x 101, e.g., music. The unknown recording is stored as a digital signal that includes samples $x_1, x_2, \ldots, x_T$. However, the title, receding artist, album name, date of production, producer genre, or any other information that could otherwise identify the recording is unknown by either the user or client. Hence, the Alice's recording is 'unknown'.

A vendor (Bob) controls a server 20 that stores an extensive database of known audio recordings $y^k$ 102. The individual recordings are $y^k_1, y^k_2, \ldots, y^k_T$. Each audio recording is associated with stored information 103, as described above, that uniquely identifies the recording. Hence, Bob's the recordings are 'known'. The audio recordings and associated information are indexed by k. Thus, knowing the index is sufficient for retrieving either the known recording or the associated information.

Alice would like to compare her unknown recording with Bob's database of known recordings to obtain the identifying information for her recording. The transaction can proceed as follows.

Alice sends a representative sample or snippet of her unknown music recording x 101 to Bob. Bob cross-con-elates 110 the snippet of x with his known recordings $y^k$ 102 to obtain a cross-correlation vector $c^k$ 104. For each known recording, the cross-correlation takes the vector product of the snippet x at various time shifted position with the known recording. The maximum vector product for the known recording is taken as the score of the matching. This step is repeated for each known recording.

A best match 105 of the cross-correlation is located 120. The best match has the highest vector product score. The index k 106 of the best matching known recording is determined 130. Alice can use the index Ar to retrieve 140 the information 103 of Bob's recording that best matches Alice's recording 101. Thus, Alice's recording becomes known.

Formally:

Alice sends x to Bob and for every receding $y^k=$, for k={1, 2, ..., K} in Bob's database, Bob determines $$c_n^k = \sum_r x_r y_{n+r}^k, \tag{1}$$

where $c^k$ 104 denote the entire cross-correlation. Bob sends Alice a vector C of K elements, where the $k^{th}$ element $c^k$ is equal to the maximum value 105 of $c^k$. The index 106 of the maximum element in the vector C indicates Bob's best matching recording. Alice accesses Bob's database rising the index k and retrieves the relevant information associated with her recording 101.

In the case of privacy constraints, Alice does not want Bob to know x, and likewise Bob does not want to Alice to learn his database. If a trusted third party is used, then both parties can remain anonymous, however Bob can still identify Alice's recording.

Therefore, the embodiments of the invention perform the method of FIG. 1 using secure multi-party computation (SMC).

Secure Two-Party Computations

The method according to embodiments of the invention is a specific example of a secure two-party computation. Consider the case where Alice and Bob have private data a and b respectively, and they want to compute the result of a function $f(a, b)$. A trusted third-party can provide the result $c=f(a, b)$ to Alice and Bob. A protocol that implements $f(a, b)$ is secure only if the protocol reveals no more information about a and b than the trusted third-party.

The method of FIG. 1 uses secure protocols, such as the Yao's millionaire's problem, the secure dot product, finding the maximum and the permute protocols, see U.S. Patent Application 20070053507, "Secure classifying of data with Gaussian distributions," filed by Smaragdis, and U.S. patent application Ser. No. 11/623,522, "System and Method for Recognizing Speech Securely", filed by Smaragdis on Jan. 1, 2007, both, incorporated herein by reference.

The method securely distributes intermediate results randomly between the two parties, such that neither party has access to the entire result. For example, instead of obtaining the entire result z for a particular protocol transaction, the parties receive random additive shares $z_1$ and $z_2$ such that $z_1+z_2=z$. The method ensures that neither Alice nor Bob can obtain the other's private data by utilizing intermediate results.

Homomorphic Public-Key Cryptosystem

A public-key cryptosystem is triple (GE, EN, DE) for key-generation, encryption and decryption, respectively. GE generates a private key sk and public key pk pair. EN encrypts plaintext m using the public key pk, and outputs EN(m, pk), the encryption of m. DE decrypts the encrypted plaintext using the private key sk.

The cryptosystem is homomorphic when algebraic operations that can be performed on the unencrypted data can also be performed by manipulating the ciphertext. One particular example of homomorphic encryption uses the property:

$$EN(a, pk) \times EN(b, pk) = EN(a+b, pk). \quad (2)$$

This implies that an untrusted party can perform operations equivalent to plaintext operations by simple computations on the corresponding encrypted plaintexts or ciphertext without having the private key necessary to decode the encrypted data.

For the audio recording matching application, Bob uses the same public key to encrypt his recording as Alice used to encrypt her private recording. Because the same public key is used and the homomorphic property, the results of the matching operation on the encrypted data produces meaningful results.

Secure Audio Comparison

As described above, the method involves the cross-correlation 110, locating 120 the maximum 105, determining the index 106 of the maximum in the cross-correlation vector, and retrieving 140 the information 103. These steps are now described in greater detail.

Cross-Correlating the Audio Signals

This involves cross-correlating 110 Alice's music snippet x 101 with each of Bob's recordings $y^k$ 102. Alice and Bob would like to perform the cross-correlation, i.e., to measure a similarity of recordings without disclosing their respective data vectors.

Therefore, Alice generates the private and public key pair (sk, pk) 11-12, and sends the public key 12 to Bob.

Alice encrypts each sample $x_i$ of her snippet of time series audio data 101 using the public key pk and sends the encrypted data $e_t$ to Bob. Formally, Alice sends $$e_t = EN(x_t, pk) \text{ for } t \in 1, \ldots, T\}.$$

Bob performs the cross-correlation 110. The computation of the $n^{th}$ intermediate result z of $c^k_n$ is $$z \leftarrow \prod_{t=1}^{T} e_t^{y^k_{n+t}}.$$

Due to the homomorphic property, the result z represents the encrypted value of $c^k_n$.

Bob generates a random number $b^k_n$, and sends the result $$z' = z \times EN(-b^k_n, pk)$$

using Alice's public key to Alice, where $b^k_n$ is Bob's share of the result of the secure dot product. Alice decrypts z' with her private key to obtain her share of the result, $$DE(z', sk) = \Sigma_t x_t y^k_{n+t} - b^k_n.$$

After calculating all intermediate results, Alice and Bob have additive vectors $a^k$ and $b^k$ such that $$a^k + b^k = c^k,$$

where $c^k$ is the entire cross-correlation. The cross-correlation is performed for each of Bob's K recording. At the end, each party has K vectors of their partial results of the cross-correlation 110.

Locating the Maximum of the Cross-Correlation

Thus, the results are distributed as private additive shares $a^k$ and $b^k$. Notice that $$c_i^k \geq c_j^k \Longleftrightarrow (a_i^k - a_j^k) \geq (b_j^k - b_i^k).$$

We now need to locate 120 the maximum 105 of the cross-correlation vectors. Alice and Bob can do such pair-wise comparisons using the secure maximum finding protocol learn the value as additive shares of the maximum. To perform the comparisons securely, they can use Yao's millionaire problem. The well-known millionaires' problem solves who is the richest, without revealing how rich.

After Alice and Bob locate the shares corresponding to the maximum, they construct two K-vectors A and B. Alice assigns $a^k_i$ as the $k^{th}$ element of the vector A, and Bob assigns $b^k_i$ as the $k^{th}$ elements of the vector B, where i is the index 106 of the maximum. The sum of $k^{th}$ elements of the vectors A and B is equal to the maximum 105 of the cross-correlation 110 between x and $y^k$.

Determining the Index of the Best Matching Recording

Alice's recording corresponds to the index for which the sum of the vectors A and B is the largest. The method again exploits the property of homomorphic encryption and the secure permute protocol to obtain additive shares $\overline{A}$ and $\overline{B}$ of a permutation of the vectors A and B, $\pi(A+B)$.

Alice sends $\overline{A} + \overline{B} - R$ to Bob, where R is a random number selected by Alice. Bob sends back the index of the maximum element of $\overline{A}$ and $\overline{B} - R$ to Alice. This enables Alice determine the index using the inverse of the permutation $\pi$. Because Bob does not know the permutation, he does not learn the index of the receding, and Alice has preserved her privacy. The random number R selected by Alice guarantees that Bob does not learn the value of the maximum.

The permute protocol is based on the homomorphic encryption and can be described as follows. Given vectors A and B, and the permutation $\pi$ known only to Alice, the desired result is additive shares $\overline{A}$ and $\overline{B}$, such that $$\overline{A} + \overline{B} = \pi(A) + \pi(B).$$

Bob generates a private and public key pair (sk, pk), and sends the public key to Alice. Bob encrypts each element of the vector B using his public key pk and sends the resulting vector to Alice.

Alice generates a random vector S and determines a vector $\theta$, where $\theta_i = EN(B_i, pk)EN(S_i, pk)$, for $i=1, \ldots, K$. The homomorphic property implies $\theta_i$ is the encryption of $B_i + S_i$.

Alice permutes $\theta$ and sends $\pi(\theta)$ to Bob. Bob decrypts the vector using his private key sk to obtain $\overline{B}$. This implies that $\overline{B}$ is a permutation of the vectors B+S. Bob cannot compare this with the original vector B to discover the permutation because S is a random vector only known to Alice.

Alice determines A−S, which is permuted it using $\pi$ to obtain $\overline{A} = \pi(A-S)$.

Retrieve the Information

After Alice determines the index 106, Alice can index Bob's database to retrieve the information. If Bob want to preserve the privacy of his database, then the method uses the secure oblivious transfer.

Let $\sigma$ denote the index 106 of the recording, known only to Alice. Bob's database of information 103 is encoded as vector $\mu = \{\mu_1, \ldots, \mu_K\}$. Alice should receive $\mu$ from the database without revealing $\mu$ to Bob.

Alice generates a homomorphic secret/public key pair (sk, pk) and sends pk to Bob. She encrypts $\sigma$ and sends $z = EN(\sigma, pk)$ to Bob. For $k = \{1, \ldots, K\}$, Bob selects random numbers $r_k$, and determines $$d_k \leftarrow EN(\mu_k, pk) \cdot (EN(-k, pk))^{r_k}$$

and sends k to Alice. Notice that this is equal to the encryption of $\mu_k + r_k(\sigma-k)$, Alice decrypts $d_\sigma$ to obtain $\mu$.

EFFECT OF THE INVENTION

The invention provides a method for matching audio recordings, such as music, to learn information about the music, such as title and recording artist. The method is privacy preserving and uses cryptographic principles.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for matching securely an unknown audio recording with known audio recordings, comprising:
   storing a plurality of known audio recordings, each known audio recording associated with an index to information uniquely identifying the known audio recording;
   cross-correlating securely an unknown audio recording with each of the plurality of known audio recordings to determine a best matching known audio recording, in which the unknown audio recording and the plurality of known audio recordings are encrypted with a public key;
   wherein the cross-correlating further comprising:
      storing an additive shares $b^k$; and
      sending to a client of the user an additive shares $a^k$, such that $a^k+b^k=c^k$, where $c^k$ is the cross-correlation;
   wherein the determining steps further comprise:
      solving a millionaire's problem using the additive shares $a^k$ and the additive shares $b^k$ to locate a maximum of the additive shares that corresponds to the best matching known audio recording;
      determining securely a best matching known audio recording according to the cross-correlating;
      determining securely the index of the best matching known audio recording; and
      providing securely the information associated with the index of the best matching known audio recording to a user of the unknown recording.

2. The method of claim 1, in which the audio recordings are stored as digital samples.

3. The method of claim 1, in which the encrypting is homomorphic.

4. The method of claim 1, wherein the determining securely of the best matching known audio recording utilizes a secure permute protocol.

5. The method of claim 1, wherein the providing securely uses a secure oblivious transfer.

6. The method of claim 1, wherein the unknown audio recording is a representative sample of music.

7. The method of claim 1, further comprising:
   computing a vector product of the unknown audio recording at time shifted position with respect to each of the plurality of known audio recording, in which each time shifted position yields a vector product score; and
   determining a maximum vector product score for each known audio recording, and in which a highest maximum score corresponds to the best matching known audio recording.

8. The method of claim 1, wherein the determining securely the best matching known audio recording uses an oblivious polynomial evaluation protocol.

9. The method of claim 1, further comprising:
   encrypting the information using the public key; and
   decrypting the encrypted information with a private key corresponding to the public key provided by the user.

10. A system for secure matching of an unknown audio recording with known audio recordings, comprising:
    a memory storing a plurality of known audio recordings, each known audio recording associated with an index to information uniquely identifying the plurality of known audio recording;
    means for cross-correlating securely an audio recording with each of the plurality of known audio recordings to determine a best matching known audio recording, in which the unknown audio recording and the plurality of known audio recordings are encrypted with a public key;
    wherein the cross-correlating further comprising:
       storing an additive shares $b^k$; and
       sending to a client of the user an additive shares $a^k$, such that $a^k+b^k=c^k$, where $c^k$ is the cross-correlation;
    wherein the determining steps further comprise:
       solving a millionaire's problem using the additive shares $a^k$ and the additive shares $b^k$ to locate a maximum of the additive shares that corresponds to the best matching known audio recording;
       means for determining securely a best matching known audio recording according to the cross-correlating;
       means for determining securely the index of the best matching known audio recording; and
       means for providing securely the information associated the index of the best matching known audio recording.

11. A system for secure matching of an unknown audio recording with known audio recordings, comprising:
    a server storing a plurality of known audio recordings, each known audio recording associated with an index to information uniquely identifying the plurality of known audio recording;
    means, at the server, for cross-correlating securely an audio recording with each of the plurality of known audio recordings to determine a best matching known audio recording, in which the unknown audio recording and the plurality of known audio recordings are encrypted with a public key;
    wherein the cross-correlating further comprising:
       storing an additive shares $b^k$; and
       sending to a client of the user an additive shares $a^k$, such that $a^k+b^k=c^k$, where $c^k$ is the cross-correlation;
    wherein the determining steps further comprise:
       solving a millionaire's problem using the additive shares $a^k$ and the additive shares $b^k$ to locate a maximum of the additive shares that corresponds to the best matching known audio recording;
       means for determining securely a best matching known audio recording according to the cross-correlating;
       means for determining securely the index of the best matching known audio recording; and
       means for providing securely the information associated the index of the best matching known audio recording to a user of the unknown audio recording.

* * * * *